United States Patent [19]

Nemoto

[11] Patent Number: 5,288,129
[45] Date of Patent: Feb. 22, 1994

[54] STRUCTURE OF A VERTICALLY MOVABLE POWERED HEADREST

[75] Inventor: Akira Nemoto, Akishima, Japan
[73] Assignee: Tachi-S Co., Ltd., Akishima, Japan
[21] Appl. No.: 871,397
[22] Filed: Apr. 21, 1992
[51] Int. Cl.⁵ ............................................. A47C 7/38
[52] U.S. Cl. ..................................... 297/410; 297/408
[58] Field of Search ............... 297/410, 338, 339, 345, 297/347, 348, 411, 391; 248/157, 405

[56] References Cited

U.S. PATENT DOCUMENTS

| | | | |
|---|---|---|---|
| 3,471,198 | 10/1969 | Homier et al. | 297/410 |
| 4,350,389 | 9/1982 | Parsson et al. | 297/410 |
| 4,637,655 | 1/1987 | Fourrey et al. | 297/410 |
| 4,668,014 | 5/1987 | Boisset | 297/410 |
| 4,923,250 | 5/1990 | Hattori | 297/410 |
| 5,131,720 | 7/1992 | Nemoto | 297/410 |

FOREIGN PATENT DOCUMENTS 192731 12/1983 Japan.
852 1/1991 Japan.

*Primary Examiner*—Peter R. Brown
*Attorney, Agent, or Firm*—Oldham, Oldham & Wilson Co.

[57] ABSTRACT

A structure of a vertically movable powered headrest, in which the headrest is moved vertically relative to a seat back by means of threaded engagement mechanism arranged between the guide member and headrest stay, which mechanism is provided in the headrest and the stay is operatively connected to a motor provided in the seat back. The structure can be applied to the headrest fore-and-aft drive mechanism without complicated fittings.

5 Claims, 3 Drawing Sheets

STRUCTURE OF A VERTICALLY MOVABLE POWERED HEADREST

BACKGROUND OF THE INVENTION

1. Field of the Invention

The present invention relates to a headrest of an automotive seat, and particularly to a structure of a powered headrest of a vertically movable type which is provided on the top of seat back of the seat and operable by a motor to raise or lower the headrest body.

2. Description of Prior Art

Typically, a headrest is provided via a pair of stays upon the seat back of an automotive seat or the like. Also known is a powered headrest of a vertically movable type wherein the headrest body may be moved under a motor drive control in a vertical direction relative to the seat back. Basically, its structure uses normally a DC geared motor and a motor drive control system based on a switch operation, thus enabling a user to adjust the headrest body to an optimum height for his or her head position by operation of switches.

In this sort of powered headrest, best known is the one of type wherein a motor is mounted within the headrest body. This has however involved such problem that the weight of headrest body is increased due to its having a motor therein, and the motor is not easy to be installed in the small inner space of headrest body. The outcome will be that the increased weight of headrest body means an increase of inert force in fore-and-aft direction in such a case of collision, which will deform and break the securing portion of motor and headrest stays, and that the installation of motor in the small space of headrest body makes more complicated the inside structure of the headrest body and requires troublesome steps of installing the motor therein, resulting in an obstacle for speed-up in the assemblage.

To address such problem, there has been known a headrest structure wherein the motor is installed in the seat back and operatively connected to the headrest body through a suitable mechanism which is arranged in both seat back and headrest body.

Yet, when it comes to the application of this vertically movable headrest structure to a fore-and-aft movable headrest mechanism, another problem arises in the complexity of mechanic elements in the seat back. That is, in the fore-and-aft movable headrest mechanism, a shaft is rotatably journalled within the seat back and rotated by a drive mechanism in the forward and backward directions, and upon that shaft, the headrest stays are fixed, so that the headrest body may be rotated forwardly and backwardly relative to the seat back. Its purpose is for providing a vision field widening effect; namely, when the headrest is rotated forwardly down to a headrest non-use position at the seat back, an occupant on the other seat can widen his or her vision field at the upper end of seat back where the headrest has been rotated at the non-use position. However, this ordinary conventional arrangement will make greater the scale of associated mechanic elements and make more complicated their mechanisms, thus resulting in posing a technical difficulty in materializing the forward and backward motions in the present vertically-movable powered headrest structure.

SUMMARY OF THE INVENTION

It is a purpose of the present invention to provide a structure of a vertically movable powered headrest in a seat, which is simplified structurally and avoids increase in weight.

In order to attain such purpose, according to the present invention, the structure basically comprises a support means for rotatably supporting at least one of a pair of headrest stays while preventing the same against movement in its axial direction, the support means being provided in the upper edge of seat back; a connecting means for operatively connecting a lower end portion of such at least one of stays to a motor disposed within the seat back; a stay guide means fixed in the headrest, the stay guide means being so arranged as to surround the stays, permitting rotation and axial movement of the stays therein and therealong; an internally threaded means which is fixed integrally to one of such at least one of stays and stay guide means; and a lead screw means which is fixed to another of such at least one of stays and stay guide means, the lead screw means being in a threaded engagement with the internally threaded means.

Accordingly, one of those internally threaded means and lead screw means is rotated through the rotation of such at least one of stays which is caused by operation of the motor, so that the headrest is raised and lowered with respective to the seat back, and therefore, the provision of motor in the seat back simplifies the inside of headrest, avoiding any electric wiring therein, and further it locates the motor remote from the headrest, thereby blocking transmission of motor's noise to the ears of occupant on the seat.

Additionally, according to the invention, a shaft may be rotatably provided in a frame of seat back, a link member be connected at is one end to the shaft, with the two headrest stays being fixed on the shaft, via the above-defined structure, and a connecting rod be connected pivotally with another end of the shaft, such that one free end of the connecting rod is connected pivotally with another end of the link member. Thus, by causing vertical movement of the connecting rod, the shaft is caused to rotate simultaneously, which in turn causes the headrest to displace between upright use and non-use positions. This effectively allows the vertically-movable-type headrest to be rotated forwardly backwardly upon the seat back, with simplified mechanical elements.

DETAILED DESCRIPTION OF PREFERRED EMBODIMENT OF THE INVENTION

Figure 1:
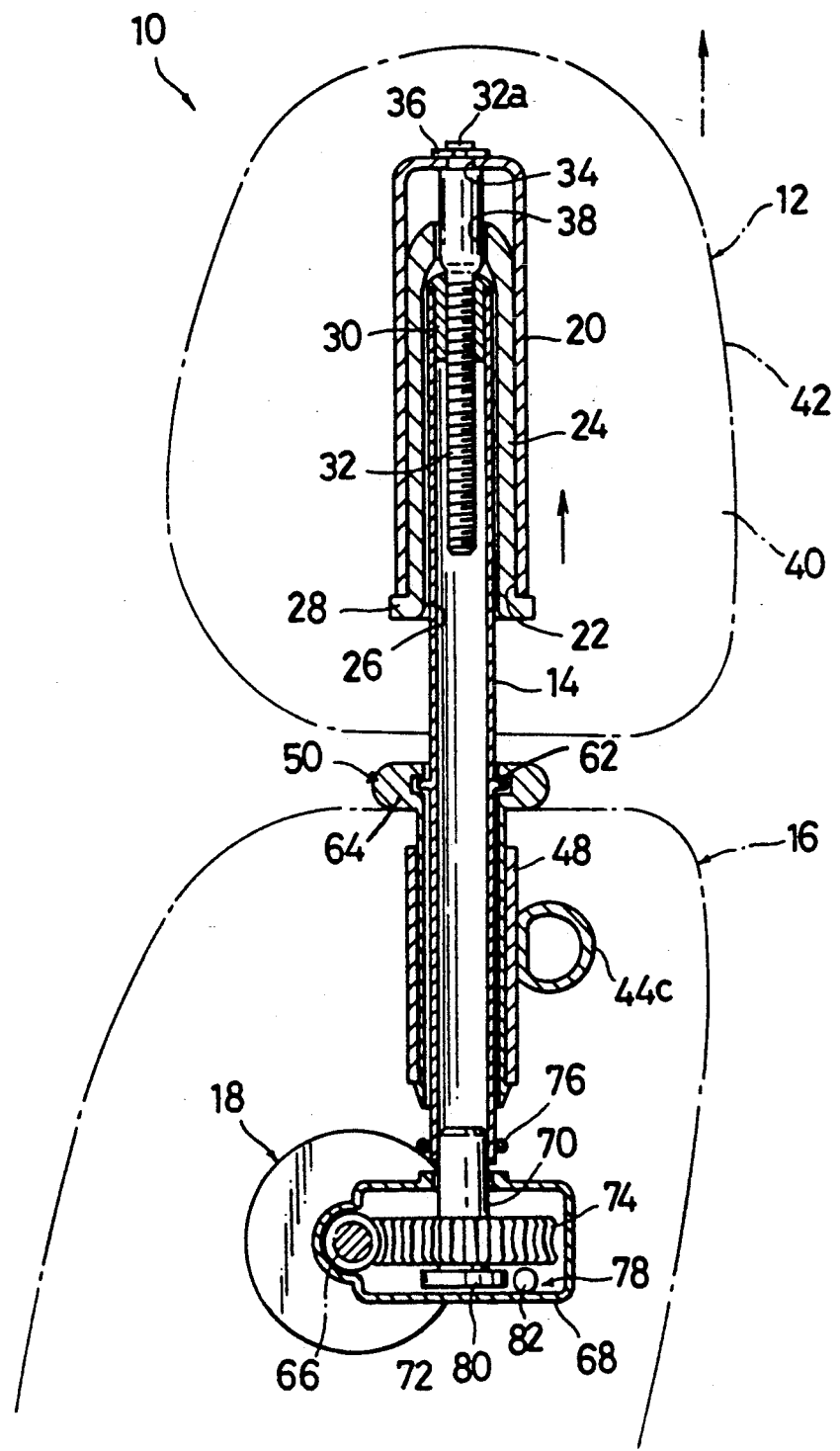
FIG. 1 is a schematically sectional view of a vertically movable powered headrest in accordance with the present invention.
Figure 2:
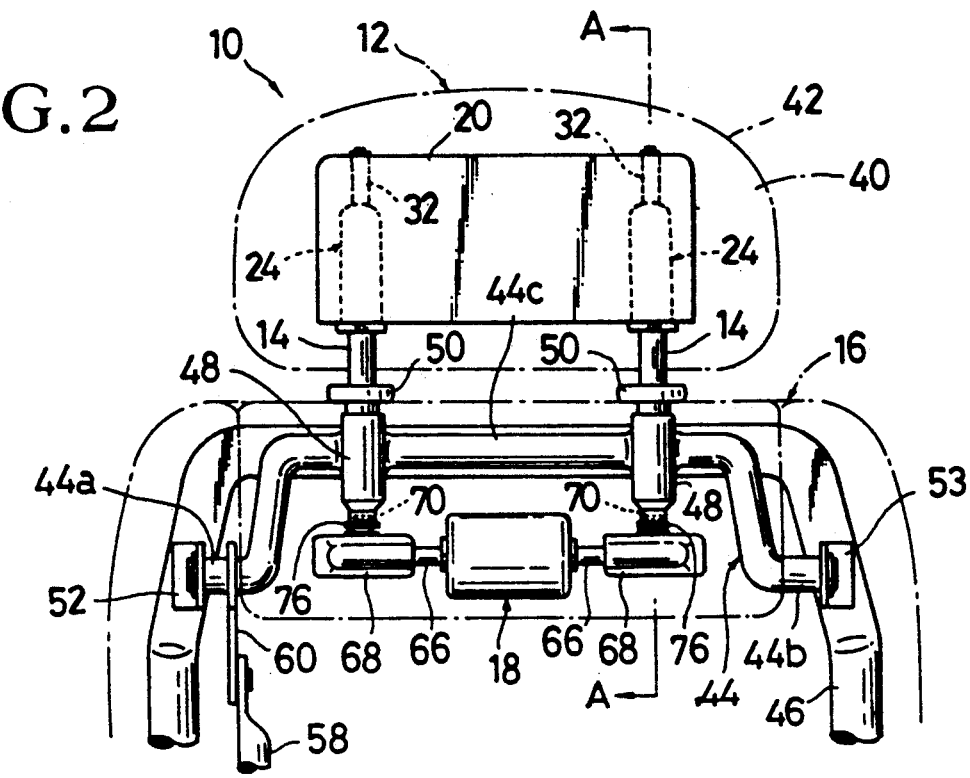
FIG. 2 is a partly broken front view of the same headrest, showing a principal portion of the present invention.

Referring to FIGS. 1 and 2, there is shown a vertically-movable powered headrest structure as generally designated at (10), in accordance with the present invention.

A headrest (12) is provided, via a pair of stays (14)(14), upon a seat back (16). The headrest (12) can be raised from and lowered towards the seat back (16) by means of the drive of a motor (18) which is installed in the seat back (16).

The two stays (14)(14) are formed from a tubular material, and disposed in a spaced-apart relation with each other as shown. A headrest core frame (20) extends between those stays (14)(14) and covers the respective upper portions thereof.

As best shown in FIG. 1, the headrest core frame (20) is formed generally in an inverted U-shaped configuration in section, having an opening (22) at its lower end. Inserted and fixed in that frame (20), are a pair of cylindrical guide members (24) (24), each having an upper opening (38) formed at its upper end and a lower opening (28) formed at its lower end. Each of guide members (24) has a bore continuously extending from such lower opening (28) at the same diameter, up to the upper opening (38) whose diameter is however smaller than that of the bore. As shown, the two guide members (24)(24) are fitted loosely over the upper portions of stays (14)(14), respectively, so that the stays are free to rotate in the respective guide members, and for that purpose, the inner bore of guide member (24) is slightly greater in diameter than the stay (14).

A flange (28) is formed about the lower end of guide member (24), and against that flange (28), the lower end of headrest frame (20) abuts, thereby serving as a stopper against further insertion of the guide member (24) into the headrest frame (20).

Designation (30) denotes an internally threaded member which is inserted and fixed in the upper portion of stay (14). Designation (32) denotes a lead screw member whose upper part is fixed to the top of headrest core frame (20). The lead screw member (32) has a securing projection (32a) which is fixedly secured in the hole (34) of headrest core frame (20) by means of a fastening ring (36). Hence, as understandable from FIGS. 1 and 2, in the headrest core frame (20), a pair of lead screw members (32)(32) are fixed in a manner dependent from the upper side of frame (20).

Figure 3:
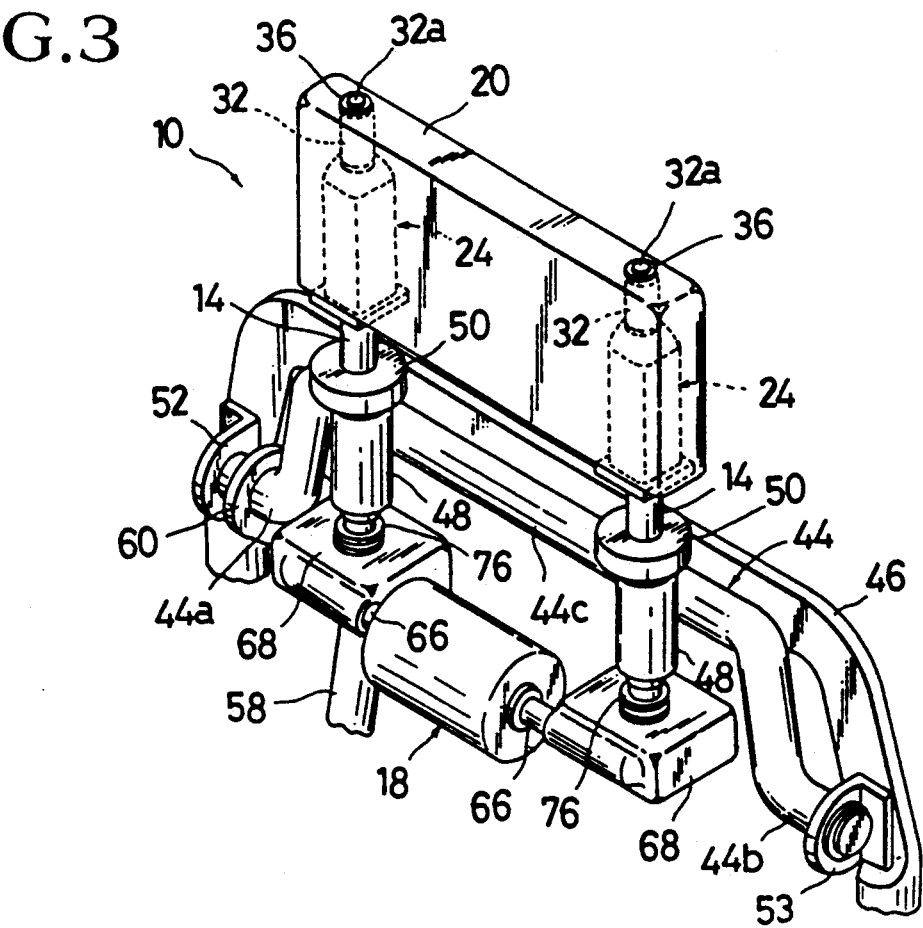
FIG. 3 is a partly broken perspective view of the same portion as in the FIG. 2.

In this respect, referring to FIG. 1 in conjunction with FIG. 3, a cylindrical headrest stay holder (50) is inserted and secured in each of the forgoing stay brackets (48)(48), and in turn, the headrest stays (14) pass through the respective stay holder (50) in a rotatable manner. As best seen from FIG. 1, each of the stays (14) has a circular flange (62) engaged rotatably in the corresponding recess formed in the upper circular flange portion (64) of the stay holder (50), to thereby prevent the stay (14) against vertical dislocation and removal from the holder (48).

Figure 4:
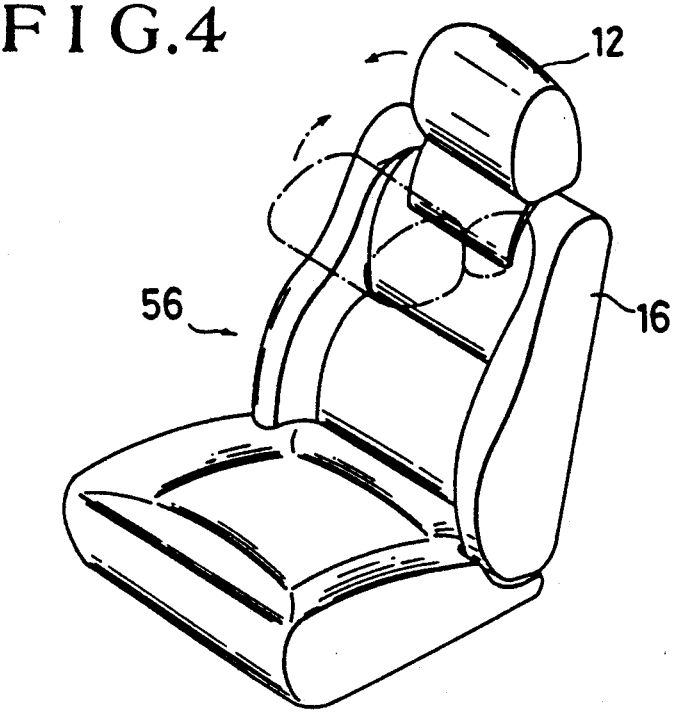
FIG. 4 is a perspective view of an automotive seat to which the headrest of the present invention is applied.
Figure 5:
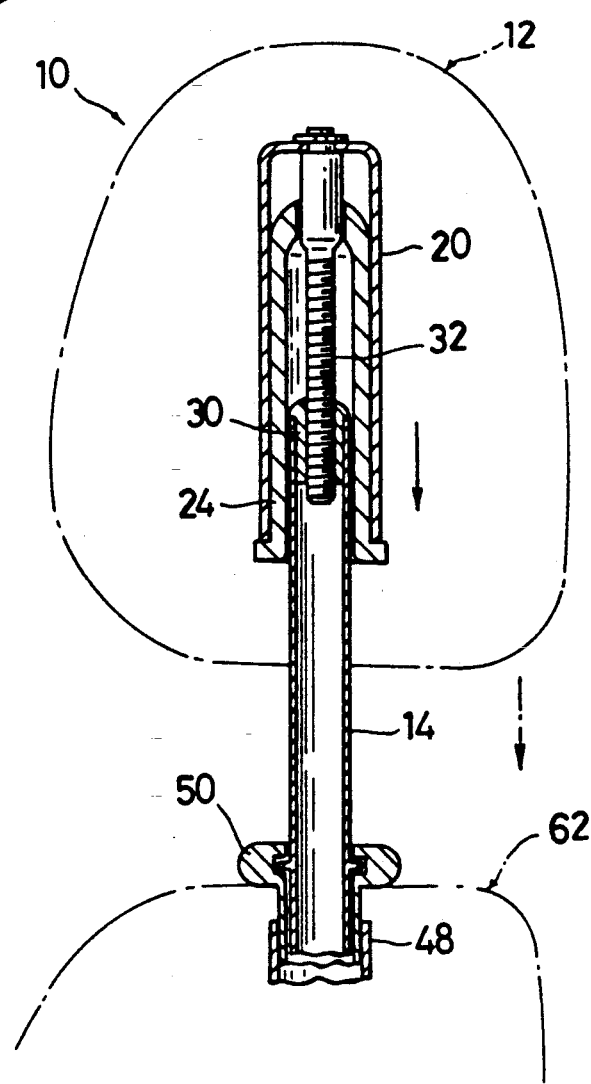
FIG. 5 is a partly broken, schematically sectional view of headrest frame and stay of the principal portion of the invention.

Designation (58) refers to a connecting rod which is operatively connected with a drive mechanism (not shown), and designation (60) refers to a link whose lower end is pivotally connected with the upper end of the connecting rod (58) and whose upper end is fixed to the left-side end portion (44a) of shaft (44). With this linkage arrangement, the vertical motion of the connecting rod (58), through operation of drive mechanism, causes the shaft (44) to be rotated forwardly and backwardly about the rotation point at (44a,44b), via the link (60). Thus, as shown in FIG. 4, the headrest (12) is rotated between the upright use position as indicated by the solid line and the downward non-use position as indicated by the one-dot chain line. This is a known headrest mechanism advantageous for widening the vision filed at the upper end of seat back (16) when the headrest (12) is located at the non-use position.

Designations (68)(68) denote a pair of gear boxes disposed on the opposite sides of and symmetrically relative to the motor (18). Through those gear boxes, both lateral output shafts (66) are operatively connected with the respective stay shafts (14)(14). More specifically, referring to FIG. 1, the free end of output shaft (66) extends into within the gear box (68), and is provided with a worm gear (72). Thus, within the gear box (58), the worm gear (72) is in a meshed engagement with a worm wheel (74) which is fixed to a drive shaft (70). The drive shaft (70) passes rotatably through the upper wall of gear box (68), and the free end portion of that drive shaft (70) is inserted and firmly fastened in the lower end portion of stay (14) by means of a securing ring (76). Such fixation of the drive shaft (70) is not limited thereto, but may be arranged in other suitable manner, by using a combination of spline shaft and hub, or the like.

The motor may be controlled by means of a manual switch (not shown) provided at a lateral wall of seat back (16) or other readily accessible point.

Now, suppose that the headrest (12) is located initially at the lowered position as shown in FIG. 1, let us describe the actions of the foregoing headrest structure (10) as below.

At the shown lowered position, when the motor (18) is driven in a normal rotation direction by operating the manual switch, for example, the drive shaft (70) is simultaneously rotated to in turn cause rotation of the stay (14) in a corresponding direction. This stay rotation directly produces the rotation of the internally threaded member (30) relative to the lead screw member (32), whereupon, the lead screw member (32) in mesh with the former (30) is caused to move upwardly relative to and in the longitudinally axial direction of the stay (14). Then, with such upward movement of lead screw member (32), the headrest core frame (20) is also displaced in the same upward direction, so that the headrest body (12) is raised from the seat back (16).

Reversely, assuming now that the headrest body (12) is located at thus-raised position and the motor (18) is driven in the reverse direction, the drive shaft (70) rotates in the corresponding reverse direction to cause likewise rotation of the internally threaded member (30), whereby the lead screw member (32) is moved downwardly along the longitudinally axial direction.

Accordingly, the output rotation of the motor (18) inside of seat back (16) is transmitted via the stays (14) into the vertical motion of lead screw member (32), thereby causing the headrest body (12) to raise from or lower toward the top of seat back (16). This eliminates the necessity to mount the motor (18) in the headrest body (12), which advantageously makes the headrest body (12) per se weightlight. The provision of motor (18) in the seat back (16) simplifies the inside of headrest body (12) and avoids any electric wiring therein, thus aiding in the speed-up of the headrest assemblage. Further, the noise of motor (18) is not easily heard by the ear of an occupant on the seat, because of its position remote from his or her ears.

Additionally, both stays (14)(14) pass through the respective stay brackets (48)(48) and the lower ends of stays (14) are operatively connected to the motor (18) via the two gear boxes (68)(68). Thus, the vertical movement mechanism (10) is simply fixed to the shaft (44) which forms part of fore-and-aft rotation mechanism (i.e. 60, 58 ...), and in accordance with the present invention, it is indeed possible to displace this sort of vertically-movable headrest between the upright use position and downward nonuse position, with a simplified structure.

Designation (78) in FIG. 1 indicates a rotation sensor which detects the number of rotation of the drive shaft (70) as a rotation number of motor (18). In brief, the rotation sensor (78) comprises a disc-like permanent magnet (80) and a lead switch (82) disposed adjacent thereto, with such an arrangement that the magnet (80) may be rotated by the rotation of drive shaft (70) and responsive thereto, the contact point of lead switch (82) is opened and closed, generating thus pulses which will be counted as the number of motor rotation, as with normal known rotation detector and electronic control. Thus-counted pulse data will be input to a suitable central processing unit (not shown) so as to detect the position of headrest body (12) in height. In the present embodiment, the disc-like permanent magnet (80) is is fixed at the bottom of the drive shaft (70).

While having described the present invention as above, it should be understood that the invention is not limited to the illustrated embodiment, but any other replacement, modification and addition may structurally be possible without departing from the spirit and scope of the appended claims. For example, the motor (18) may only be connected to one of the two stays (14) via one gear box (68). The motor (18) may also be fixed to the shaft (44) by means of a bracket or the like, instead of the embodiment shown. With regard to the internally threaded member (30) and lead screw member (32), in contrast to the embodiment, the former (30) may be fixed to the guide member (24) and the latter (32) be fixed in the stay (14). This will cause the lead screw member (32) to be rotated by the stay (14) and thus gives a vertical movement to the internally threaded member (30) so as to achieve the upward and downward motion of headrest body (12). The present headrest structure (10) may be applied not only to the automotive seat but also to other kinds of seats used in trains, airplanes, or ships, or barber's seat as well as household seats.

What is claimed is:

1. A structure of a vertically movable powered headrest in a seat, in which said headrest is movably supported via a pair of stays upon an upper edge of a seat back of said seat, said structure comprising:
    a support means for rotatably supporting at least one of said pair of stays while preventing the same against movement in its axial direction, said support means being provided in said upper edge of said seat back;
    a connecting means for operatively connecting a lower end portion of said at least one of said stays to a motor disposed within said seat back;
    a stay guide means fixed in said headrest, said stay guide means being so arranged as to surround said stays, permitting rotation and axial movement of said stays therein and therealong;
    an internally threaded means which is fixed integrally to one of said at least one of said stays and said stay guide means; and
    a lead screw means which is fixed to another of said at least one of said stays and said stay guide means, said lead screw means being in a threaded engagement with said internally threaded means,
    wherein operating said motor causes said at least one of said stays to rotate, which in turn causes one of said internally threaded means and lead screw means to rotate simultaneously, so that another of said internally threaded means and lead screw means, which is threadedly engaged with said one of them, is moved vertically relative to the latter, and thus said headrest is raised and lowered with respective to said seat back.

2. The structure as defined in claim 1, wherein said support means comprises a pair of cylindrical stay holders provided in said seat back, through which said pair of stays pass rotatably, respectively, a circular recess formed in at least one of said cylindrical stay holders, and a circular flange formed integrally on said at least one of said stays, said circular flange being rotatably fitted in said circular recess to thereby prevent said stays against said axial movement.

3. The structure as defined in claim 1, wherein said internally threaded means is fixed in an upper end of said at least one of stays, and wherein said lead screw means is at its one end fixed in said headrest and disposed in a manner dependent therefrom to extend into said at least one of stays in a threadengagement with said internally threaded means, whereby operating said motor causes rotation of said internally threaded means to simultaneously cause rotation of said lead screw means so as to raise and lower said headrest with respect to said seat back.

4. The structure as defined in claim 1, wherein a seat back frame having lateral frame sections is provided within said seat back, wherein there is rotatably extended a shaft having an offset portion and extending between both lateral frame sections of said seat back frame, wherein a means is provided for causing said shaft to be rotated forwardly and backwardly relative to said seat back frame and thus to said seat back, and wherein said pair of stays are fixed to said shaft via said support means, whereby said headrest may also be displaced between an upright use position upon said seat back and a non.-use position defined forwardly of said seat back, through operation of said means, in order to permit setting said headrest at said use position to support a head of occupant on said seat or setting said headrest at said non-use position below said upper edge of said seat back.

5. The structure as defined in claim 4, wherein said means comprises a link member whose one end is fixed to said shaft and a connecting rod whose one end is pivotally connected with another end of said link member, and wherein said connecting rod is moved to cause rotation of said link member so as to rotate said shaft simultaneously for effecting said displacement between said upright use position and said non-use position.

* * * * *